United States Patent [19]
Rasmus et al.

[11] Patent Number: 5,822,426
[45] Date of Patent: Oct. 13, 1998

[54] BALANCED HYBRID CIRCUIT

[75] Inventors: Todd Morgan Rasmus; James William Sylivant, both of Cary, N.C.

[73] Assignee: International Business Machines Corporation, Armonk, N.Y.

[21] Appl. No.: 469,709

[22] Filed: Jun. 6, 1995

[51] Int. Cl.[6] .................................................. H04M 1/76
[52] U.S. Cl. ........................ 379/402; 379/399; 379/405; 330/69
[58] Field of Search .................................... 379/402, 405, 379/399, 394, 398, 392, 345, 347, 404, 406, 93.01, 93.02; 370/24, 27, 28, 32; 330/252, 69, 146

[56] References Cited

U.S. PATENT DOCUMENTS

| | | | |
|---|---|---|---|
| 4,163,878 | 8/1979 | Hashemi | 379/405 |
| 4,174,470 | 11/1979 | Seidel | 379/405 |
| 4,670,870 | 6/1987 | Hewinson et al. | 370/28 |
| 4,856,058 | 8/1989 | Sato et al. | 379/394 |
| 4,989,243 | 1/1991 | Choi | 379/402 |
| 5,127,046 | 6/1992 | Malm | 379/98 |
| 5,253,249 | 10/1993 | Fitzgerald | 379/406 |
| 5,402,485 | 3/1995 | Takato et al. | 379/402 |
| 5,479,504 | 12/1995 | Nakano et al. | 379/402 |
| 5,524,047 | 6/1996 | Brown et al. | 379/93 |

FOREIGN PATENT DOCUMENTS

3322642 A 1  1/1985  Germany.

OTHER PUBLICATIONS

*IBM Technical Disclosure Bulletin*, "Telecommunications Transmitter/Receiver with Sidetone Suppression," vol. 25, No. 4, Sep. 1982.

Primary Examiner—Daniel S. Hunter
Assistant Examiner—Jacques Saint-Surin
Attorney, Agent, or Firm—Steven B. Phillips

[57] ABSTRACT

Large signal swings are obtained for the transmitted signal of a telephone line modem using differential drivers. Compensation for the complex nature of line impedance is provided without affecting the response of the receive circuits. Common-mode noise is effectively cancelled due to a fully balanced topology for the transmit and receive portions of the hybrid circuit.

23 Claims, 3 Drawing Sheets

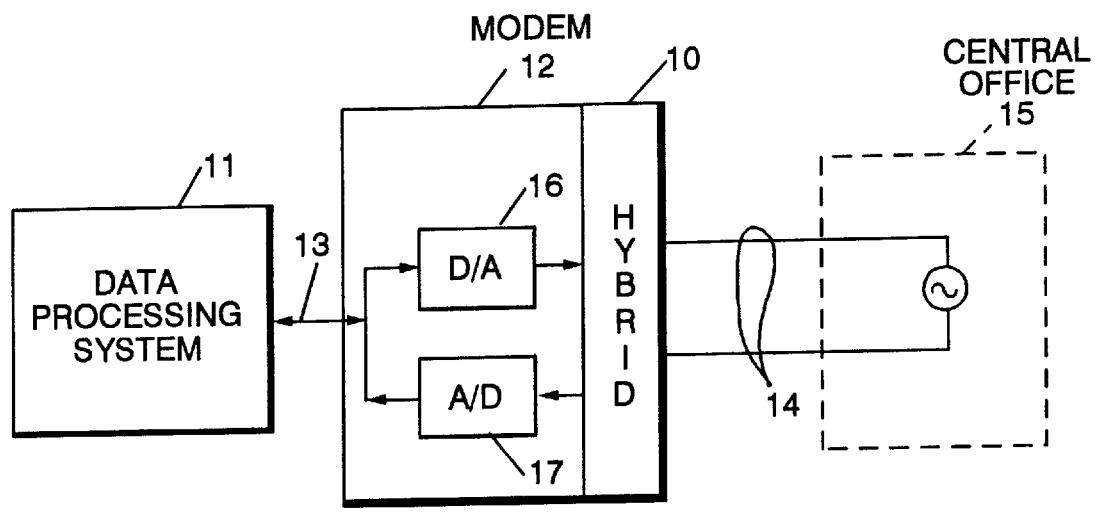
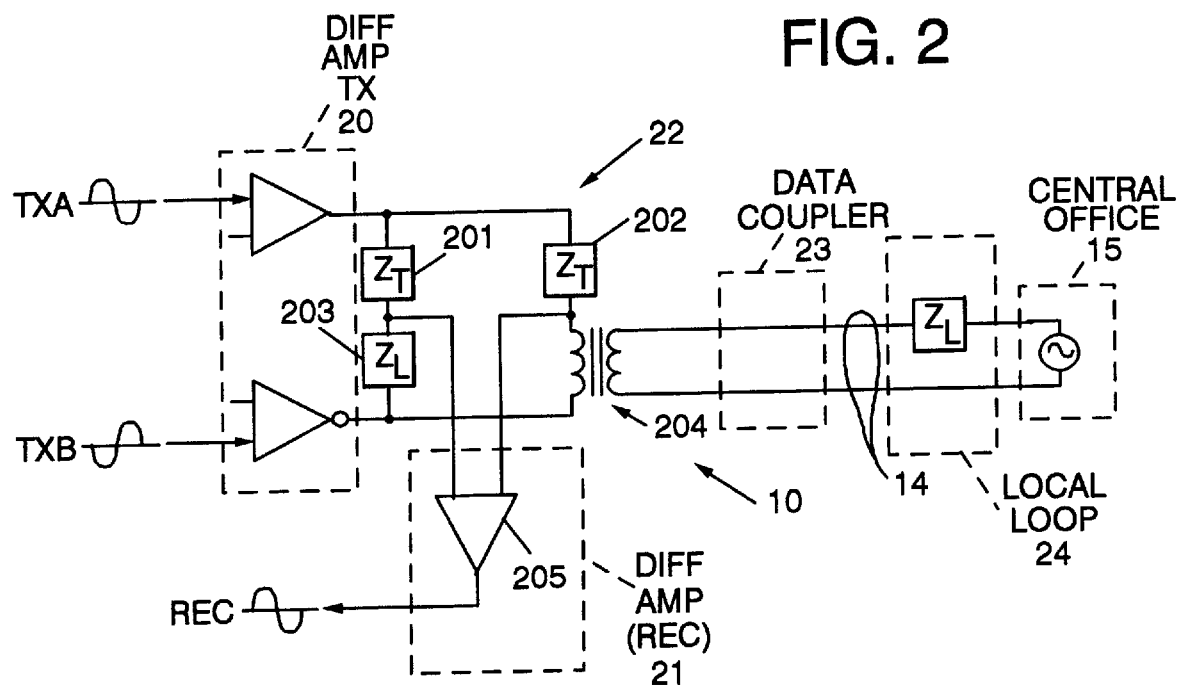

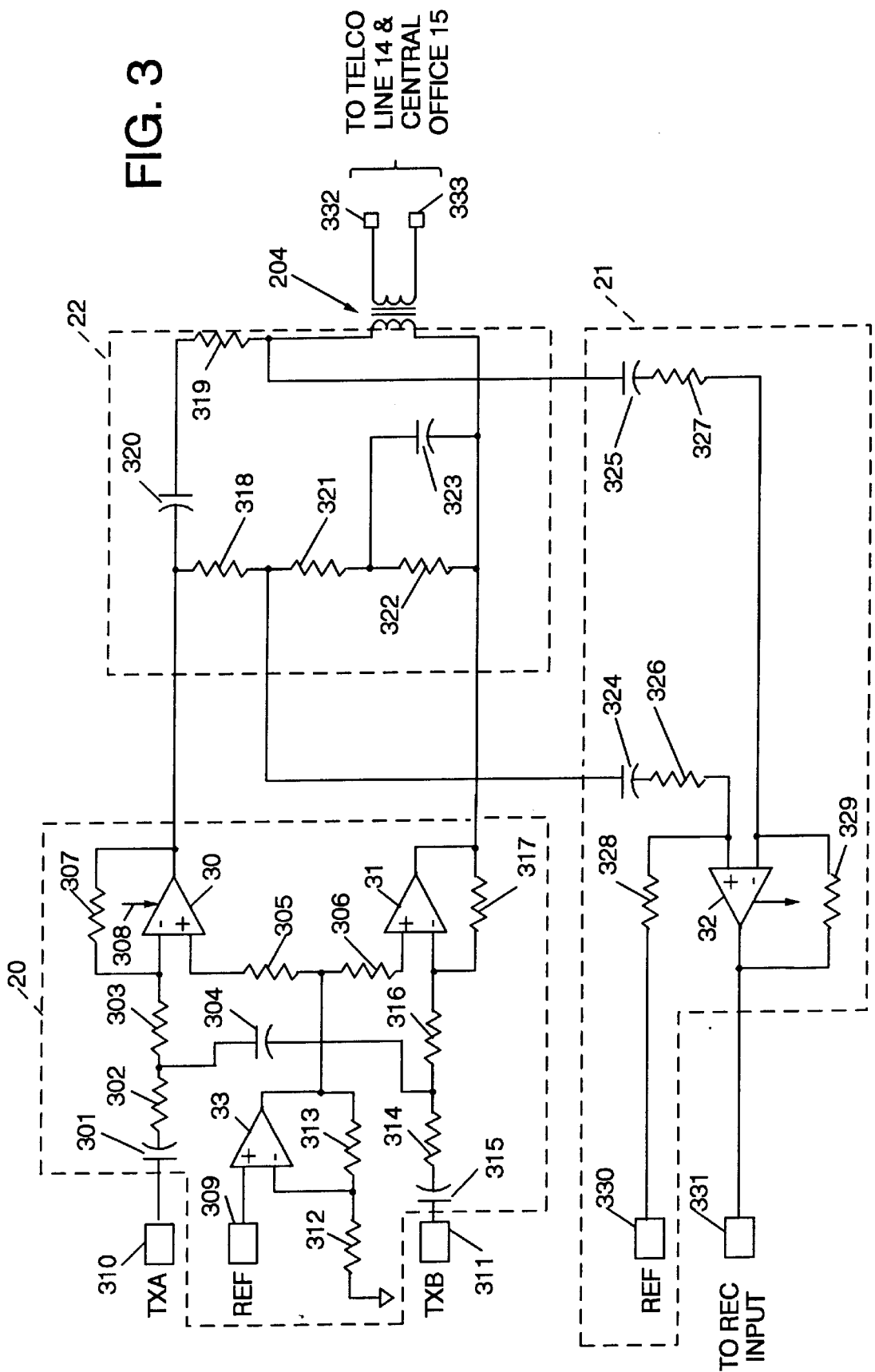

BALANCED HYBRID CIRCUIT

TECHNICAL FIELD OF THE INVENTION

The field of the invention relates in general to telecommunications, and in particular to a hybrid circuit within a modem for coupling to a telephone line.

BACKGROUND OF THE INVENTION

A computer is a digital device. It accomplishes most of its tasks by turning on or off a series of electronic switches. There is no in-between designation.

The existing telephone system is an analog device, designed, at a time when digital electronics was unknown, to transmit the diverse sounds and tones of the human voice. Those sounds are conveyed electronically in an analog signal as a continuous electronic current or voltage that smoothly varies its frequency and strength.

A modem is the bridge between digital and analog signals. It converts on and off digital data into an analog signal by varying, or modulating, the frequency, phase, amplitude or other characteristic of an electronic signal. On the receiving end of a phone connection, a modem performs the opposite by demodulating the analog signals back into a digital code.

Typically, a modem is connected to a two-wire telephone line coupled to the telephone company's central office. The function within a modem commonly used for the separation of transmit and receive signals on the two-wire telephone line is referred to as a hybrid. Typically implemented as shown in FIG. 4, the hybrid usually consists of transmit driver 401 feeding line transformer 408 through an impedance chosen to provide the correct line termination (usually 600 ohms for telephone lines). Because the incoming receive signal from central office 15 through local loop 24 appears across the windings of line transformer 408 along with the modem's own transmit signal, the hybrid function senses and subtracts out the transmit signal from the mixed signal. Ideally, the transmitted signal is completely cancelled and only the receive signal is seen at the input of the receiver in order to insure that the modem accurately transfers correct data.

Several problems are encountered by such prior art hybrid topologies. First, the receive signal received from the telephone line can have a large dynamic range, typically varying from −41 dBm (0.007 Vrms) to −6 dBm (0.390 Vrms) as referenced to 1 milliwatt (mW) into 600 ohms. At the minimum receive level, common-mode noise originating from multiple sources (Vcc, ground, capacitively coupled, etc.) can easily rival the signal amplitude. The receive signal integrity can then be severely compromised, resulting in an unacceptably low signal-to-noise ratio.

Second, common-mode noise coupling into the transmit signal path can create both in-band and out-of-band noise sources which are amplified and transmitted to the telephone line as signal information. Strict agency standards (i.e., FCC Part 68 and European PTT regulations) restrict and limit the amount of noise allowed to be transmitted to the telephone company, or telco, line. As physical card densities increase and present a noisier environment in which the hybrid must function, the rejection of this common-mode noise becomes very critical.

Third, a disadvantage of the topology illustrated in FIG. 4 is that, while successfully separating the transmit signal from the receive signal, the receive signal amplitude is attenuated at higher pass-band frequencies by the feedback network comprising amplifier 404 and devices 405–407.

Fourth, since the telephone line must be terminated with a correct impedance, there is an impedance (Z-match) in series with the line transformer (with voltage drive topology). This means that the voltage at the driver's output must be at least twice the level desired on the telephone line. Amplifiers cannot source voltages in excess of the power supply, and in fact cannot typically approach within a couple of volts of the power supply. This limits the maximum peak transmit level to an unacceptably low level for many applications.

As a result of the foregoing, there is a need in the art for an improved hybrid circuit for coupling a modem to a two-wire telephone line.

SUMMARY OF THE INVENTION

The present invention solves the foregoing needs. The present invention comprises a balanced hybrid circuit including a differential transmit amplifier, a differential receive amplifier, and an H-bridge line compensation network. The differential transmit amplifier is preferably composed of two symmetrical gain stages, which drive the H-bridge line compensation network differentially. The differential input signal is amplified to a sufficient voltage to achieve the desired transmit level on the telephone line. By driving differentially, twice the peak-to-peak signal is obtained over what would be possible with single-ended drive topologies. Also, common-mode noise originating from multiple sources are largely attenuated due to the high common-mode rejection of this balanced driver stage.

The hybrid circuit also receives a signal from the central office through a line transformer. This signal is then driven to a remainder of the modem for conversion into a digital signal. The hybrid circuit rejects the transmit signal at the point where the received signal is supplied to a means for driving the received signal to the modem.

An advantage of the present invention is that it provides a differentially balanced transmit driver which provides much higher common-mode noise rejection than prior art single-ended topologies.

Furthermore, the present invention provides a hybrid topology that does not attenuate the received signal amplitude at higher pass-band frequencies.

And, still another advantage of the present invention is that it provides a balanced differential driver in a bridge configuration, which provides twice the signal voltage swing compared to that of single-ended driver topologies for a given power supply voltage, thus increasing the maximum transmit voltage level by at least +6 dB.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 1 illustrates the use of a modem to couple a data processing system to a telephone line;

FIG. 2 illustrates a preferred embodiment of the present invention;

FIG. 3 illustrates a more detailed diagram of a preferred embodiment of the present invention.

DETAILED DESCRIPTION OF A PREFERRED EMBODIMENT OF THE INVENTION

Figure 4:
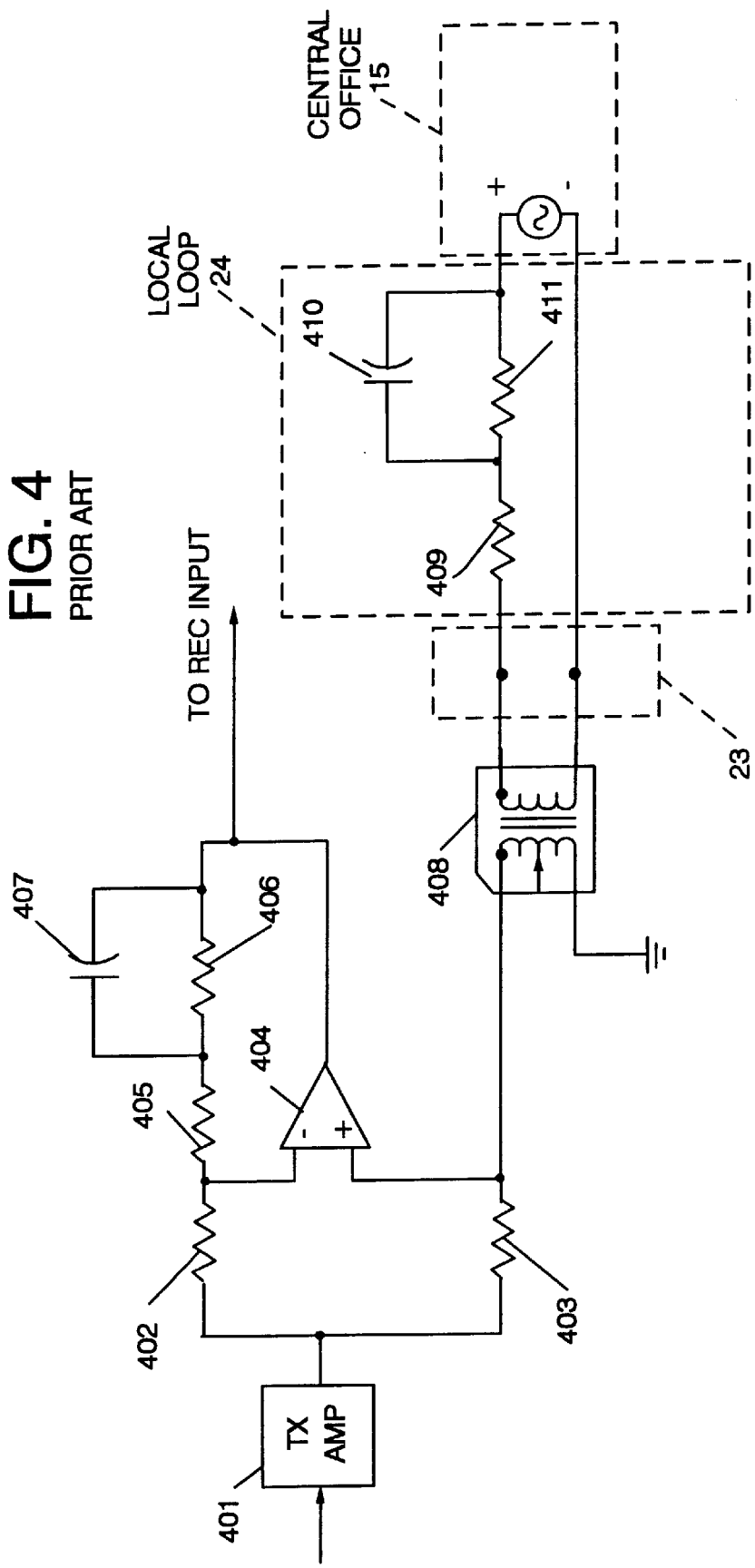
FIG. 4 illustrates a prior art hybrid topology.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated data processing system 11 coupled to telephone line 14 through modem 12. Data processing system 11 may be any well-known computer system having a microprocessor, storage, input/output means, etc. Connection 13 may be a serial or parallel connection between modem 12 and data processing system 11. Modem 12 may be any typical modem and includes digital-to-analog converter 16 for converting digital signals received from data processing system 11 into analog signals for transmission on telephone line 14, and also includes analog-to-digital converter 17 for receiving analog signals from telephone line 14 for conversion into digital signals for transfer to data processing system 11. Converters 16 and 17 are well-known in the art. Telephone line 14 may be coupled to central office location 15.

The subject of the present invention is hybrid circuit 10, which is utilized to couple modem 12 to two-wire telephone line 14. Hybrid circuit 10 receives analog signals from converter 16 and transmits analog signals to converter 17. Hybrid circuit 10 may be included along with the circuitry within modem 12.

Referring next to FIG. 2, there is illustrated a preferred embodiment of hybrid circuit 10 coupled to central office 15 through telephone line 14, which has local loop 24 with an impedance $Z_L$. The coupling of hybrid circuit 10 to telephone line 14 is provided through typical data coupler 23.

The primary elements comprising hybrid circuit 10 include differential transmit amplifier 20, differential receive amplifier 21, and H-bridge line compensation network 22. Differential transmit amplifier 20 is comprised of two symmetrical gain stages, which drive H-bridge line compensation network 22 differentially. The differential input signal, Vin (diff)=Vtxa−Vtxb is amplified to a sufficient voltage to achieve the desired transmit level on telephone line 14. By driving differentially, twice the peak-to-peak signal is attained over what would be possible with single-ended drive topologies (see FIG. 4). Also, common mode noise originating from multiple sources (i.e., Vcc, ground, voltage references, or even capacitively coupled through the air) are largely attenuated due to the high common mode rejection of this balanced driver stage 20.

The modem's differential output circuitry (not shown), which derives differential signals TXA and TXB, may be provided by a voice band audio processor, which offers a differential output. For single-ended applications, a simple inverter stage may be added to provide the complimentary signal TXB necessary for the balanced differential drive.

H-bridge line compensation network 22 is driven differentially by transmit amplifier 20. The primary function of network 22 is to provide correct line termination (usually 600 ohms for telephone lines 14) and to compensate for the line impedance $Z_L$ of local loop 24, necessary for good hybrid rejection. Impedances $Z_T$ 201 and 202 and $Z_L$ 203 represent the line termination resistance and impedance compensation network, respectively. Transmit amplifier 20 drives H-bridge network 22 differentially, resulting in the impedance-divided transmit signal voltage being impressed across data coupler transformer 204. With good matching to the line impedance, $Z_L$ of local loop 24 by the compensation network impedance $Z_L$ 203, this same transmit signal voltage also appears across impedance $Z_L$ 203, which is important for the operation of differential receiver 21.

Differential receiver 21 is a balanced differential amplifier whose two differential inputs coupled to H-bridge compensation network 22 at the nodes interconnecting $Z_T$ 201 and $Z_L$ 203, and $Z_T$ 202 and line transformer 204. Because the transmit signal appears at both input node connections, the transmit signal appears as a common-mode input voltage to differential receive amplifier 21 and little or no transmit signal appears at the input to analog to digital converter 17. The transmitted signal is thus cancelled and only the receive signal is seen at the output of amplifier 21.

The present invention provides line compensation for the hybrid due to the impedance variations of local loop 24 by providing impedance 203, which is chosen to be equal to the impedance presented by transformer 204 as a result of the effects of data coupler 23 and electrical characteristics of transformer 204. Voltage from the differential transmit amplifier 20 appears as a common mode signal to receiver 21. Since impedance matching network 203 does not appear in the receive signal path, there are no frequency modifications of the receive signal at the output of differential receiver 21.

Referring next to FIG. 3, there is illustrated a more detailed circuit diagram of a preferred embodiment of the present invention. Differential transmit input signal TXA from the modem's differential interface is coupled to an input of an inverting amplifier 30. Series input resistors 302 and 303 and feedback resistor 307 provide a gain of approximately 3.67. Terminal 310 is coupled to resistor 302 through capacitor 301.

Differentially connected capacitor 304 filters high frequency, out-of-band differential-mode noise which may originate from the modem's output. The positive input of amplifier 30 is fed from the output of amplifier 33, which amplifies a voltage reference at terminal 309 (e.g., 2.5 volts to 6 volts). This sets the output of amplifier 30 to a voltage level (with no input signal applied) that is midway between the voltage supply and ground potentials. Series resistor 305 may be used (if necessary) to compensate for input bias current effects. Input capacitor 301 is used to block DC from the negative input of amplifier 30 and yields a low frequency −3 dB cut-off well below the lowest frequency of interest.

Amplifier 31 is an identical amplifier as amplifier 30, which provides the complimentary signal necessary for balanced differential drive and is fed by signal TXB through terminal 311 from the modem's differential interface. Circuit elements 306 and 314–317 are identical, respectively, to circuit elements 305 and 301–303 and 307.

The output from amplifier 30 is coupled to line transformer 204 through series matching resistor 319 and coupling capacitor 320. Capacitor 320 is chosen large enough to produce sufficient low frequency response. Capacitor 320 is required because typically no DC is allowed to flow through transformer 204.

Resistor 318, along with the local loop compensation network comprising elements 321–323 are also connected differentially across the outputs of amplifiers 30 and 31. The purpose of the local loop compensation network is to provide a match to the impedance of the twisted pair local loop 24 (see FIG. 2) as reflected through transformer 204. Circuit element 318 is identical to circuit element 319.

Amplifier 32 is a differential amplifier that takes its input from coupler transformer 204 and the line compensation network comprising elements 321–323. The transmit signal appears as a common-mode signal to the input to differential amplifier 32. With amplifier 32 having a large common-mode rejection and the line compensation network having a good match to local loop 24, little or no transmit signal will appear at output 331 of amplifier 32. The gain of amplifier 32 is set by the ratio of resistor 329 and the series elements 324–327 in order to provide the correct signal level for the modem's input.

The reference voltage at 309 typically has variations due to noise. Due to the complete differential nature of both transmit and receive circuits, this noise is cancelled for the transmit and receive signals.

Although the present invention and its advantages have been described in detail, it should be understood that various changes, substitutions and alterations can be made herein without departing from the spirit and scope of the invention as defined by the appended claims.

What is claimed is:

1. A circuit for connecting a full duplex two wire communication line for simultaneously conducting information signals in two directions to a signal source and to a signal receiver comprising:
    an H bridge compensation network;
    a first differential amplifier for coupling the signal source to said H bridge compensation network; and
    a second differential amplifier coupled to said H-bridge compensation network for coupling the H bridge compensation network to the signal receiver.

2. The circuit as recited in claim 1, wherein said first differential amplifier further comprises two symmetrical gain stages that drive said H-bridge compensation network with a differential input signal.

3. The circuit as recited in claim 2, wherein said differential input signal comprises an input signal and an inverse of said input signal.

4. The circuit as recited in claim 2, wherein an output of a first one of said two symmetrical gain stages that drive said H-bridge compensation network with a differential input signal is coupled to a first terminal of said H-bridge compensation network, and wherein an output of a second one of said two symmetrical gain stages that drive said H-bridge compensation network with a differential input signal is coupled to a second terminal of said H-bridge compensation network, and wherein a first input of said second differential amplifier is coupled to a third terminal of said H-bridge compensation network, and wherein a second input of said second differential amplifier is coupled to a fourth terminal of said H-bridge compensation network.

5. The circuit as recited in claim 1, wherein said H-bridge compensation network includes a transformer adaptable for coupling to a two-wire telephone line coupled to a telephone central office.

6. The circuit as recited in claim 1, wherein said H-bridge compensation network further comprises first and second impedances connected in series between terminals of said first differential amplifier, wherein a first input of said second differential amplifier is connected to a junction connecting said first and second impedances, and wherein said H-bridge compensation network further comprises third and fourth impedances connected in series between said terminals of said first differential amplifier, wherein a second input of said second differential amplifier is connected to a junction connecting said third and fourth impedances.

7. The circuit as recited in claim 6, wherein said second differential amplifier further comprises an operational amplifier having a first input coupled through a first resistor to said junction connecting said first and second impedances and a second input of said second differential amplifier coupled through a second resistor to said junction connecting said third and fourth impedances, wherein said first input of said operational amplifier is coupled to a reference voltage supply, and wherein said second input of said operational amplifier is coupled through a resistor to an output of said operational amplifier.

8. The circuit as recited in claim 6, wherein said first differential amplifier further comprises a third amplifier having an output coupled to a junction between said first and third impedances and to a first input of said third amplifier through a resistor, wherein said first input of said third amplifier is coupled to a first input of said first differential amplifier adaptable for receiving an input signal, and wherein a second input of said third amplifier is coupled to a reference voltage; and a fourth amplifier having an output coupled to a junction between said second and fourth impedances and to a first input of said fourth amplifier through a resistor, wherein said first input of said fourth amplifier is coupled to a second input of said first differential amplifier adaptable for receiving an inverse of said input signal, and wherein a second input of said fourth amplifier is coupled to said reference voltage.

9. A balanced hybrid circuit adaptable for transmitting and receiving signals, said circuit comprising:
    means for receiving a differential signal;
    means, coupled to said means for receiving said differential signal, for driving a transformer with said differential signal resulting in a transmit signal corresponding to said differential signal being applied across said transformer;
    means for receiving a signal from said transformer;
    means, coupled to said means for receiving said signal from said transformer, for driving said signal received from said transformer to a receive terminal; and
    means for rejecting said transmit signal at said means for receiving a signal from said transformer.

10. The circuit as recited in claim 9, wherein said means, coupled to said means for receiving said differential signal, for driving said transformer with said differential signal resulting in said transmit signal corresponding to said differential signal being applied across said transformer further comprises a differential transmit amplifier.

11. The circuit as recited in claim 10, wherein said differential transmit amplifier further comprises two symmetrical gain stages coupled to said means for receiving said differential signal, wherein said means for receiving said differential signal further comprises a first terminal for receiving a first part of said differential signal and a second terminal for receiving a second part of said differential signal, wherein said second part of said differential signal is an inverse of said first part of said differential signal, and wherein said first terminal is coupled to a first one of said two symmetrical gain stages and said second terminal is coupled to a second one of said two symmetrical gain stages.

12. The circuit as recited in claim 9, wherein said means for rejecting said transmit signal at said means for receiving said signal from said transformer further comprises an H-bridge line compensation network.

13. The circuit as recited in claim 12, wherein said H-bridge line compensation network further comprises first and second impedances coupled between first and second terminals of said means for driving said transformer with said differential signal, and a third impedance coupled between said first terminal of said means for driving said transformer with said differential signal and said transformer, wherein said means for receiving said signal from said transformer is coupled to a terminal between said first and second impedances, and wherein said means for receiving said signal from said transformer is coupled to a terminal between said third impedance and said transformer.

14. The circuit as recited in claim 9, wherein said means for driving said signal received from said transformer to said receive terminal further comprises an amplifier having its inputs coupled to said means for receiving said signal from said transformer, wherein an output of said amplifier is coupled through a resistor to one of said inputs.

15. A modem comprising:
   means adaptable for coupling to a data processing system;
   means adaptable for coupling to a two wire full duplex telephone line;
   an analog-to-digital converter for converting analog signals received from the two wire full duplex telephone line to digital signals;
   a digital-to-analog converter for converting digital signals from a source into analog signals for transmission over the full duplex two wire telephone line; and
   a balanced hybrid circuit comprising:
      an H-bridge compensation network;
      a differential transmit amplifier coupled to said H-bridge compensation network, said differential transmit amplifier coupled to said digital-to-analog converter; and
      a differential receive amplifier coupled to said H-bridge compensation network, said receive amplifier coupled to said analog-to-digital converter.

16. The modem as recited in claim 15, wherein said differential transmit amplifier further comprises two symmetrical gain stages that drive said H-bridge compensation network with a differential input signal received from said digital-to-analog converter, wherein said differential input signal comprises an input signal and an inverse of said input signal, and wherein said H-bridge compensation network includes a transformer coupled to said means adaptable for coupling to a telephone line.

17. The modem as recited in claim 16, wherein an output of a first one of said two symmetrical gain stages that drive said H-bridge compensation network with said differential input signal is coupled to a first terminal of said H-bridge compensation network, and wherein an output of a second one of said two symmetrical gain stages that drive said H-bridge compensation network with said differential input signal is coupled to a second terminal of said H-bridge compensation network, and wherein a first input of said differential receive amplifier is coupled to a third terminal of said H-bridge compensation network, and wherein a second input of said differential receive amplifier is coupled to a fourth terminal of said H-bridge compensation network.

18. The modem as recited in claim 15, wherein said H-bridge compensation network further comprises first and second impedances connected in series between terminals of said differential transmit amplifier, wherein a first input of said differential receive amplifier is connected to a junction connecting said first and second impedances, and wherein said H-bridge compensation network further comprises third and fourth impedances connected in series between said terminals of said differential transmit amplifier, wherein a second input of said differential receive amplifier is connected to a junction connecting said third and fourth impedances.

19. The modem as recited in claim 18, wherein said differential receive amplifier further comprises an operational amplifier having a first input coupled through a first resistor to said junction connecting said first and second impedances and a second input of said differential receive amplifier coupled through a second resistor to said junction connecting said third and fourth impedances, wherein said first input of said operational amplifier is coupled to a reference voltage supply, and wherein said second input of said operational amplifier is coupled through a resistor to an output of said operational amplifier.

20. The modem as recited in claim 18, wherein said differential transmit amplifier further comprises a first amplifier having an output coupled to a junction between said first and third impedances and to a first input of said first amplifier through a resistor, wherein said first input of said first amplifier is coupled to a first input of said differential transmit amplifier adaptable for receiving an input signal, and wherein a second input of said first amplifier is coupled to a reference voltage; and a second amplifier having an output coupled to a junction between said second and fourth impedances and to a first input of said second amplifier through a resistor, wherein said first input of said second amplifier is coupled to a second input of said differential transmit amplifier adaptable for receiving an inverse of said input signal, and wherein a second input of said second amplifier is coupled to said reference voltage.

21. A circuit comprising:
   an H-bridge compensation network; and
   a differential transmit amplifier coupled to said H-bridge compensation network, wherein said differential transmit amplifier further comprises two symmetrical gain stages that drive said H-bridge compensation network with a differential input signal, wherein the differential input signal comprises an input signal and an inverse of said input signal.

22. A modem comprising:
   means adaptable for coupling to a data processing system;
   means adaptable for coupling to a telephone line;
   an analog-to-digital converter;
   a digital-to-analog converter; and
   a hybrid circuit comprising:
      a network; and
      a differential transmit amplifier coupled to said network, said differential transmit amplifier coupled to said digital-to-analog converter, wherein said differential transmit amplifier further comprises two symmetrical gain stages that drive said network with a differential input signal, wherein the differential input signal comprises an input signal and an inverse of said input signal.

23. The modem as recited in claim 22, wherein said network comprises an H-bridge compensation network.

* * * * *